(12) United States Patent
Noma et al.

(10) Patent No.: US 9,354,914 B2
(45) Date of Patent: May 31, 2016

(54) STORAGE SYSTEM

(75) Inventors: Shohei Noma, Kawasaki (JP);
Kenichirou Shimogawa, Kawasaki (JP);
Soichi Shigeta, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 722 days.

(21) Appl. No.: 13/551,687

(22) Filed: Jul. 18, 2012

(65) Prior Publication Data

US 2013/0081015 A1    Mar. 28, 2013

(30) Foreign Application Priority Data

Sep. 26, 2011    (JP) .................................. 2011-208846

(51) Int. Cl.
*G06F 9/455*    (2006.01)

(52) U.S. Cl.
CPC .. *G06F 9/45558* (2013.01); *G06F 2009/45579* (2013.01); *G06F 2009/45591* (2013.01)

(58) Field of Classification Search
None
See application file for complete search history.

(56) References Cited

U.S. PATENT DOCUMENTS

| 7,539,709 B1 * | 5/2009 | Vengerov et al. |
| 7,730,486 B2 | 6/2010 | Herington |
| 7,797,572 B2 | 9/2010 | Kawashima et al. |
| 2008/0063173 A1 * | 3/2008 | Sarkar et al. ............. 379/202.01 |

FOREIGN PATENT DOCUMENTS

| JP | 5-257720 | 10/1993 |
| JP | 2006-244481 | 9/2006 |
| JP | 2007-207219 | 8/2007 |
| JP | 2009-265778 | 11/2009 |

* cited by examiner

*Primary Examiner* — Craig Dorais
(74) *Attorney, Agent, or Firm* — Fujitsu Patent Center

(57) ABSTRACT

The I/O performance measurement unit of Hypervisor measures latencies of I/O process requests to virtual disks, and reports the average value of the latencies to the I/O performance information collection unit of the management server. The provision destination determination unit sets, as a storage unit to which a virtual disk is to be allocated, that is a storage unit having the smallest average value of the latencies among storage units to which virtual disks have been provided.

8 Claims, 19 Drawing Sheets

FIG. 6A

Hypervisor1

| VIRTUAL MACHINE | VDisk | latency |
|---|---|---|
| VG1 | VD1 | 12msec |
| VG1 | VD3 | 30msec |
| VG2 | VD2 | 40msec |
| VG2 | VD2 | 30msec |

FIG. 6B

Hypervisor2

| VIRTUAL MACHINE | VDisk | latency |
|---|---|---|
| VG3 | VD3 | 18msec |
| VG3 | VD3 | 16msec |
| VG4 | VD4 | 16msec |
| VG4 | VD4 | 10msec |

FIG. 6C

MANAGEMENT SERVER

| VIRTUAL MACHINE | VDisk | latency [msec] |
|---|---|---|
| VG1 | VD1 | 10 |
| VG1 | VD3 | 30 |
| VG2 | VD2 | 35 |
| VG3 | VD3 | 17 |
| VG4 | VD4 | 13 |

FIG. 8A

| VIRTUAL MACHINE | Hypervisor | disks |
|---|---|---|
| VG1 | VH1 | VD1、VD3 |
| VG2 | VH1 | VD2 |
| VG3 | VH2 | VD3 |
| VG4 | VH2 | VD4 |

FIG. 8B

| Vstorage | capacity | allocated | free | StorageUnit |
|---|---|---|---|---|
| VS1 | 4TB | 600GB | 2400GB | SU1 |
| VS2 | 4TB | 2300GB | 1700GB | SU2 |
| VS3 | 4TB | 3800GB | 200GB | SU2 |
| VS4 | 4TB | 0GB | 4000GB | SU3 |

FIG. 8C

| Vdisk | size | Vstorage |
|---|---|---|
| VD1 | 100GB | VS1 |
| VD2 | 500GB | VS2 |
| VD3 | 100GB | VS2 |
| VD4 | 100GB | VS3 |

| Storage Unit \ Hypervisor | SU1 | SU2 | SU3 |
|---|---|---|---|
| VH1 | latency:10msec *accessible:ture | latency:35msec accessible:ture | latency:— accessible:false |
| VH2 | latency:— accessible:false | latency:15msec accessible:true | latency:— accessible:false |

F I G. 9

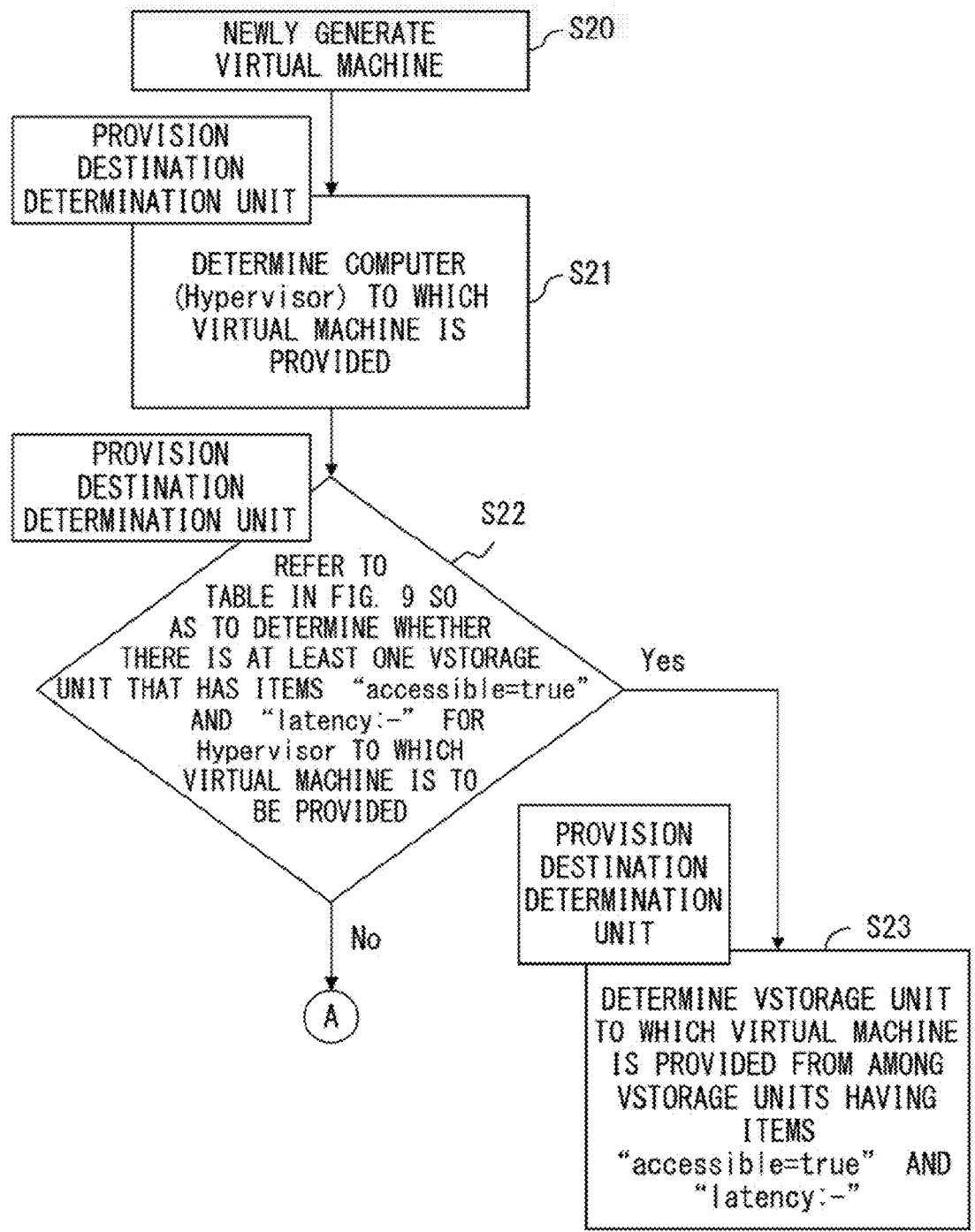
F I G. 1 1 A

| VIRTUAL MACHINE | VDisk | latency [msec] | frequency of I/O request [/min] |
|---|---|---|---|
| VG1 | VD1 | 10 | 36 |
| VG1 | VD2 | 30 | 10 |
| VG2 | VD2 | 35 | 28 |
| VG3 | VD3 | 17 | 6 |
| VG4 | VD4 | 13 | 20 |

F I G. 1 2

STORAGE SYSTEM

CROSS-REFERENCE TO RELATED APPLICATION

This application is based upon and claims the benefit of priority of the prior Japanese Patent Application No. 2011-208846, filed on Sep. 26, 2011, the entire contents of which are incorporated herein by reference.

FIELD

The embodiments described herein are related to a storage system.

BACKGROUND

In recent years, capacities of storage devices have become larger, and services have been discussed in which data received from users via networks are stored in storage devices included in a server. This service is referred to as a cloud service. In order to configure a large capacity storage device, a number of real storage devices are connected to a computer, and highly efficient management of these storage devices is performed by using the computer. In such a case, a plurality of virtual machines for managing storage devices are set in a computer, and virtual storage devices are set in real storage devices in order to realize flexible management.

FIG. 1 illustrates a block configuration of a computer in which a virtual machine 12 is set.

A computer 9 including a plurality of virtual machines has hardware 10 for executing actual processes. The hardware 10 includes the virtual machine 12 that uses hardware resources. There is a virtual machine monitor 11 for controlling operations of the virtual machine 12 in the hardware 10. A storage unit 14 is connected to the computer 9.

FIG. 2 is a block diagram of the storage unit 14.

The computer 9 on which the virtual machine 12 operates is connected to the storage unit 14. A storage unit 15 is a group of real storage devices, and a plurality of virtual disks (VDisk) 17 are set for the plurality of real storage devices, and the plurality of the virtual disks 17 constitute a virtual storage device (VStorage) 18.

A virtual machine monitor (VMM) 11 is also referred to as Hypervisor. This is a program in a layer in which it controls the entire VM system, and performs dispatching of the virtual machine 12. Also, the virtual machine monitor 11 performs emulation of a privileged instruction (writing instruction or reading instruction) to be expected by each of the virtual machine 12, hardware control on the CPU, and the like. Hypervisor first operates during booting of the VM system, and activates the virtual machine 12.

The virtual machine 12 is a virtual machine that performs ordinary operations of an OS. Instructions to storage units are executed through the virtual machine monitor 11, and the virtual machine 12 does not include a real input/output interface, and only a virtual input/output interface is allocated.

The virtual disk (VDisk) 17 is a disk to be used by the virtual machine 12.

FIG. 3 illustrates a concept of a virtual storage device.

When there are three disks of 500 GB as real storage devices and direct access is to be made to these real storage devices, each of these disks are accessed as separate disks each having 500 GB. However, by setting these three disks as a single virtual storage device, access can be made as if there is a single disk of 1500 GB. As described above, by setting a virtual storage device, it is possible to group real storage devices so as to construct a disk system appropriate to a situation.

Conventional techniques include a technique of simplifying the I/O monitoring, a technique of sharing resources in accordance with the circumstances of virtual machines, and a technique of providing a standby system node to an active system node so that switching between them can be performed. Further, there is a technique of monitoring the performance of a single application that is operating on a plurality of servers or virtual machines, and when the performance by the application does not reach a prescribed level, the application migrates to a different server that has vacant resources.

Patent Document 1: Japanese Laid-open Patent Publication No. 5-257720

Patent Document 2: Japanese Laid-open Patent Publication No. 2009-265778

Patent Document 3: Japanese Laid-open Patent Publication No. 2007-207219

Patent Document 4: Japanese Laid-open Patent Publication No. 2006-244481

FIG. 4 illustrates a problem of a conventional technique.

As a general rule, virtual disks to be allocated when a virtual machine is generated are generated in a virtual storage device having a large free volume. This is based on a reason of "large free volume=fewer users=less access convergence=quicker response".

However, when a plurality of storage units are connected to the computer 9, a distance between the computer 9 and those storage units are different from each other, and "having a large free volume" does not necessarily mean "good response". Specifically, when the distance between the computer and each storage unit is long, switches for connecting networks are set between them, and the responses may sometimes be deteriorated by operation delays of those switches or the like. Further, the operation rates of storage units may also be different from the each other.

Thus, a conventional technique in which a virtual disk generated on a virtual storage device having a large free volume is allocated to the virtual machine 12 may deteriorate the disk access performance from the virtual machine 12.

Specifically, when a new virtual machine is provided, the management server 15 for managing the computer 9 refers to and allocates only free volumes in the virtual disk. When users specify an allocation area, the only criterion is the volume of a virtual disk. As a result of this, a virtual disk is allocated to a storage unit having a long latency, deteriorating the performance of the virtual machine.

SUMMARY

A storage system according to an aspect of embodiments described below includes a plurality of storage units to which a virtual disk is provided; a plurality of computers provide, to activate a virtual machine and thereby control a virtual disk, to issue an input/output process request to a virtual disk and to measure a latency of the input/output process request; and a management server to provide, to the computer and the storage unit, a combination of a virtual machine and a virtual disk that has a smallest average value of latencies in accordance with latencies measured by the computers.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIGS. 6A through 6C illustrate a data configuration employed in the present embodiment (first);

FIGS. 8A through 8C illustrate a data configuration employed in the present embodiment (third);

FIG. 9 illustrates a data configuration employed in the present embodiment (fourth);

FIGS. 11A and 11B illustrate data configuration employed in the present embodiment (sixth);

FIG. 12 illustrates a data configuration employed when migration is performed;

DESCRIPTION OF EMBODIMENTS

In the present embodiment, a response time (latency) of an I/O process request from a virtual machine to a virtual disk is recorded by a hypervisor. Hypervisors report the recorded latency information to the management server. The management server calculates the average value of the latencies between the Hypervisors and the storage units on the basis of information reported from the respective Hypervisors. The Hypervisors interpret the information about "virtual machine-virtual disk" as information about "Hypervisor-storage unit". The management server uses the collected data after the above interpretation in order to make decisions for providing virtual machines. In other words, a combination (between a virtual machine and a storage unit) with a short latency is employed.

In the present embodiment, a latency is measured on the basis of disk access that the virtual machine needs to perform, and accordingly it is possible to cope to dynamic modifications of configurations of the system (the addition of server or storage units, etc.), bringing about an effect that extra loads for measuring a latency are not imposed on a network.

In other words, virtual disks can be generated for storage units having short latencies, making it possible to improve the I/O process performance of virtual machines.

Also, even when the configuration has been modified by the addition of a new virtual machine or a storage unit, information is collected dynamically, making it possible to select an optimum virtual storage at arbitrary timings.

Even in a large-scale environment such as one in which a virtual machine is connected to a lot of storage units, only ordinary I/O access is monitored, preventing extra traffic from occurring for collecting performance data. In other words, the latency is measured on the basis of access that has to actually be performed, which prevents extra loads on the network.

Virtual machines that were provided while the environment was still being constructed, which was not a sufficient level of information to collect, are not always in the optimum arrangement. However, it is possible to always arrange virtual machines at optimum positions when virtual machines are newly provided because information has been collected.

Figure 1:
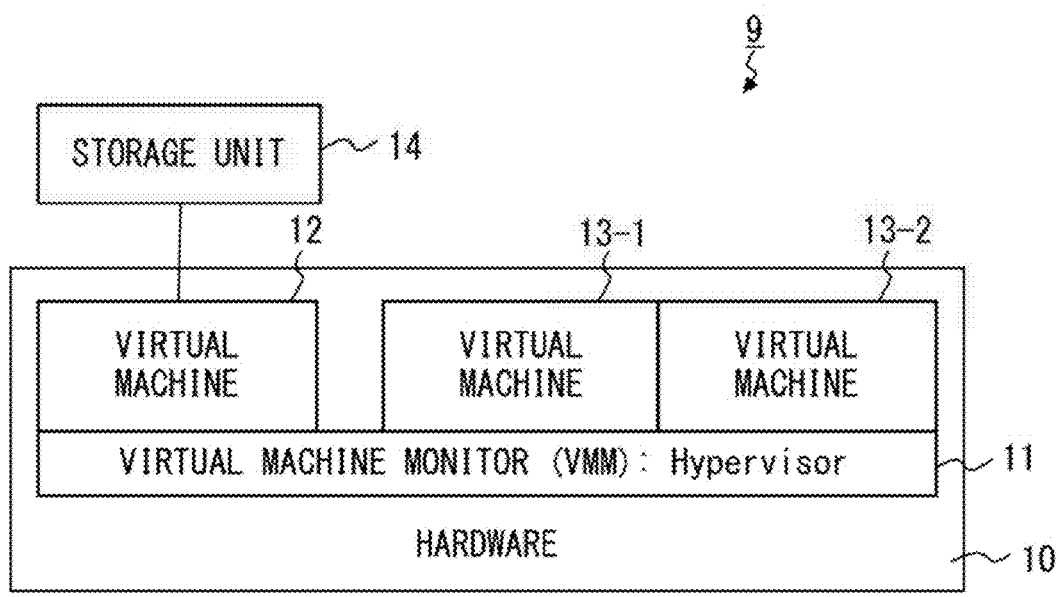
FIG. 1 illustrates a block configuration of a computer in which a virtual machine is set.
Figure 2:
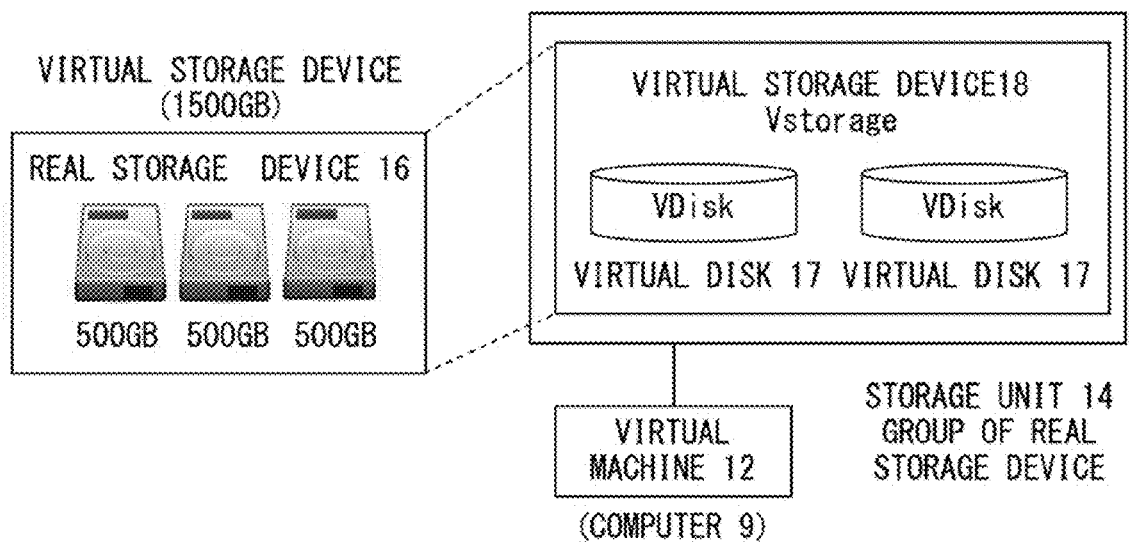
FIG. 2 is a block diagram of a storage unit.
Figure 3:
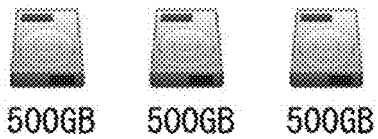
FIG. 3 illustrates a concept of a virtual storage device.
Figure 4:
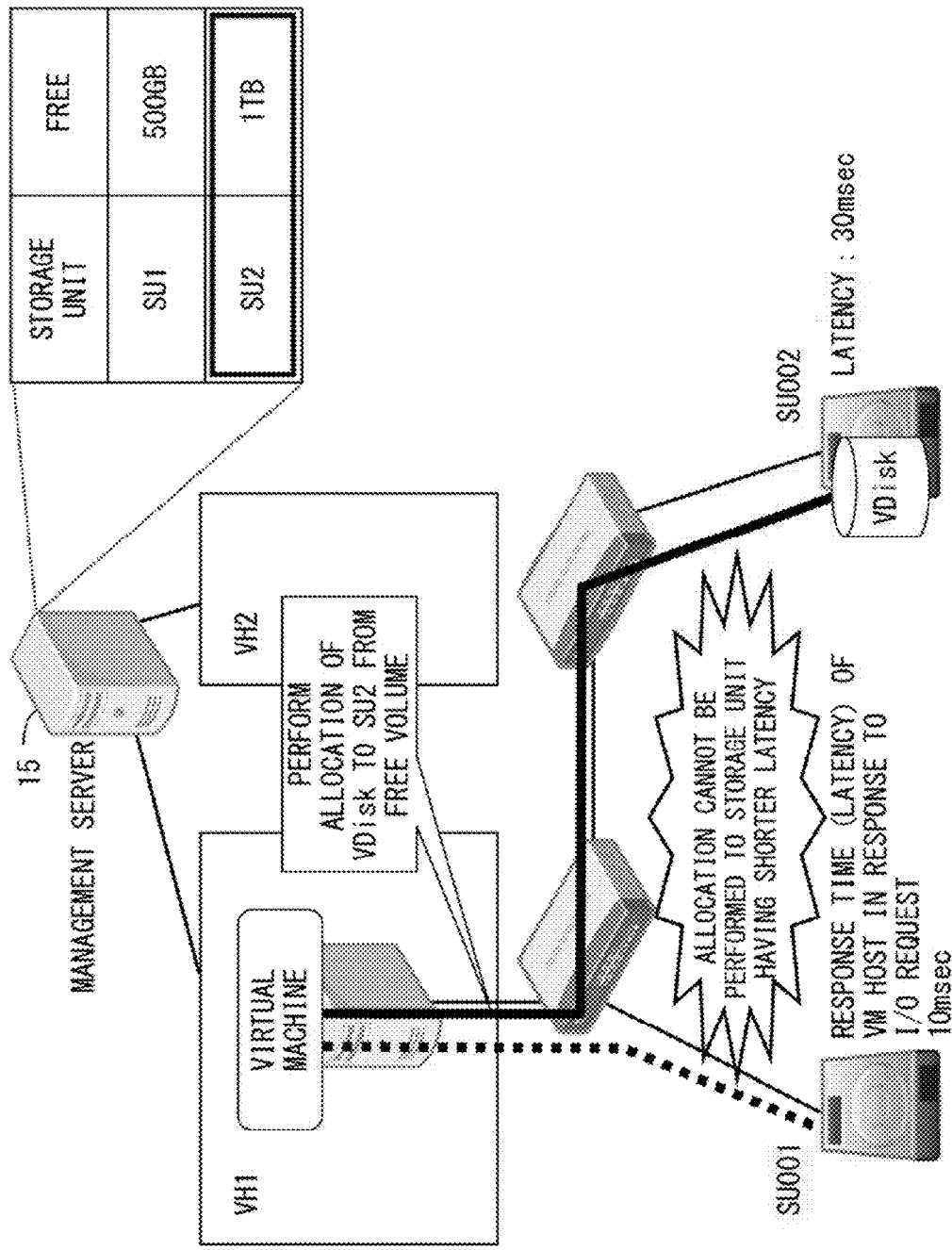
FIG. 4 illustrates a problem of a conventional technique.
Figure 5:
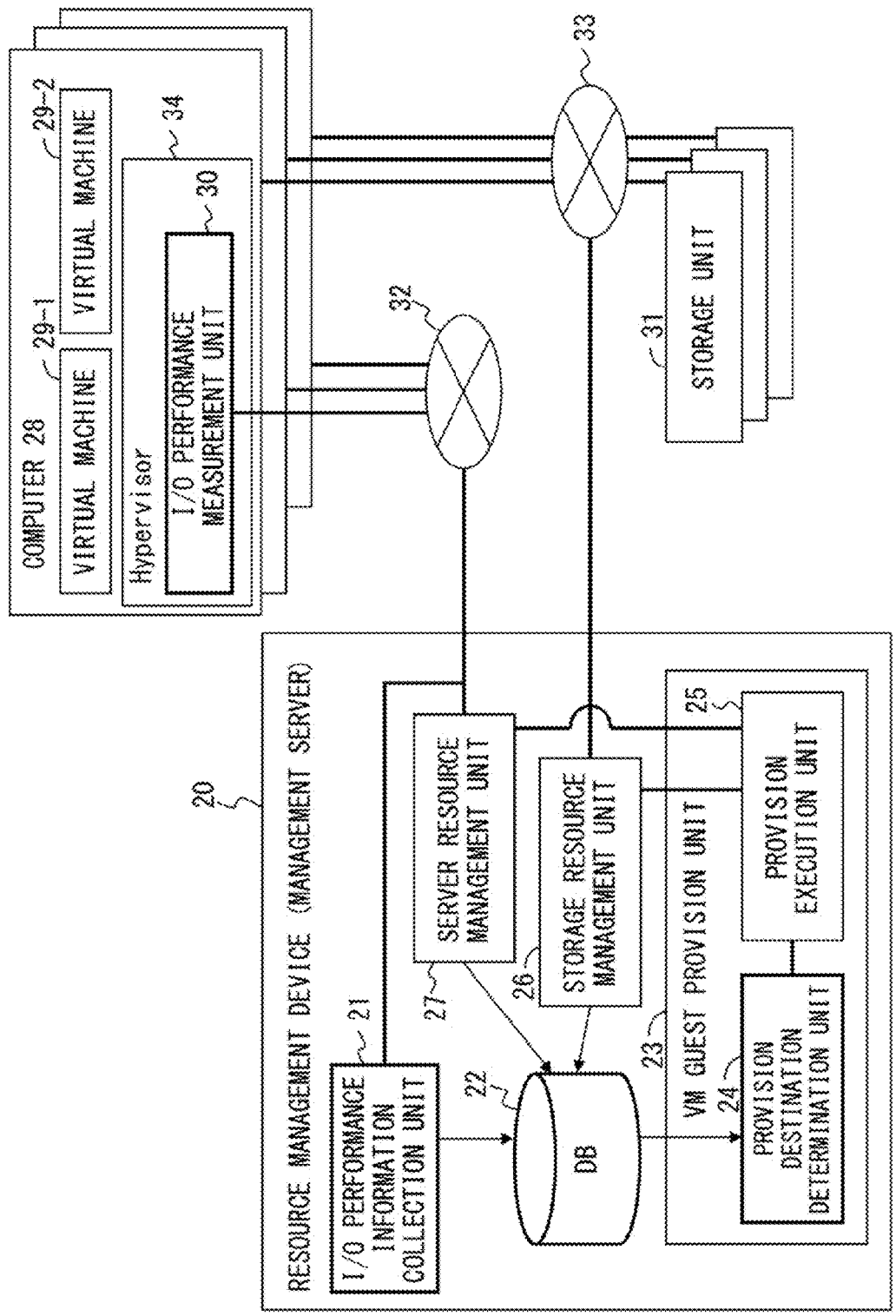
FIG. 5 is a block diagram of a present embodiment.

FIG. 5 is a block diagram according to the present embodiment.

A resource management device (management server) 20 is connected to storage units 31 and virtual machines (computers or servers) 28 via networks 32 and 33. A storage resource management unit 26 monitors the number of real disks and the volume in the storage units 31, and stores these types of information in a database 22. A server resource management unit 27 collects information about operation statuses of the virtual machine 28 and the like via a Hypervisor. The collected information is stored in the database 22.

An I/O performance information collection unit 21 collects information about the latency of I/O processing measured by an I/O performance measurement unit 30 in a Hypervisor 34, and stores the collected information in the database 22. A VM guest provision unit 23 includes a provision destination determination unit 24 and a provision execution unit 25. The provision destination determination unit 24 determines, in accordance with the information stored in the database 22, which of the VM guests a virtual disk is to be provided to. The provision execution unit 25 provides server resources and storage resources in accordance with the provision destination determined by the provision destination determination unit 24.

FIGS. 6A through 11 illustrate data configurations employed in the present embodiment.

Figure 7:
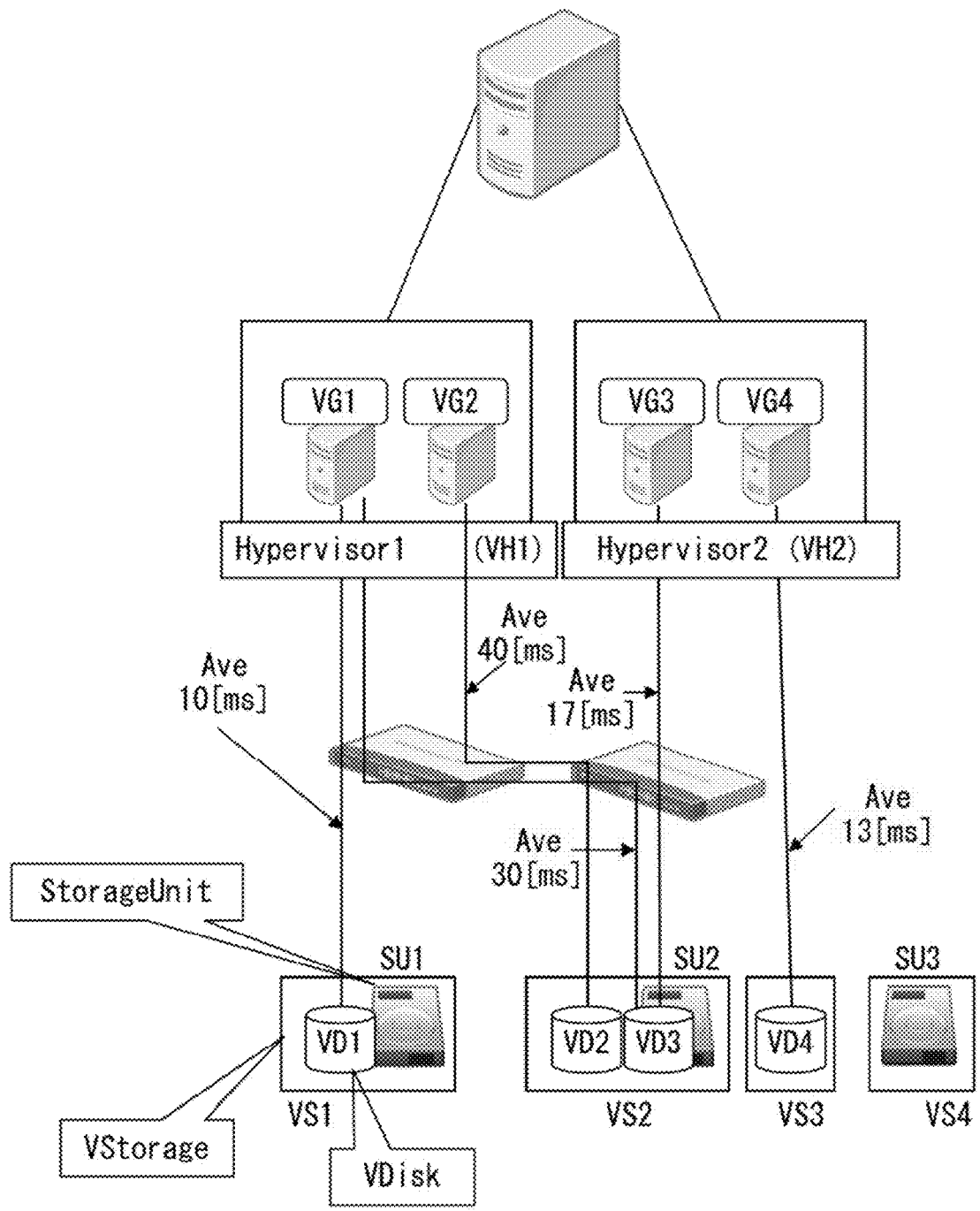
FIG. 7 illustrates a data configuration employed in the present embodiment (second)

FIGS. 6A through 6C illustrate data related to latencies obtained in the configuration illustrated in FIG. 7. In FIG. 7, the virtual machines (VG1 through VG4) monitored by Hypervisor1 and Hypervisor2 access virtual disks (VD1 through VD4) via a network. The tables illustrated in FIGS. 6A and 6B record the latencies for each access. These tables record the values of the latencies for combinations between virtual machines and virtual disks accessed by virtual machines for every Hypervisor. The table illustrated in FIG. 6C records the average values of the latencies measured when a virtual machine accessed a virtual disk for combinations between a virtual machine and virtual disks in accordance with the latency information obtained from the table illustrated in FIGS. 6A and 6B. This table is stored in a database in the management server.

FIGS. 8A through 8C illustrate other management tables to be stored in a database of the management server. FIG. 8A illustrates a virtual machine management table. This table registers which virtual disk each virtual machine is connected to and via which Hypervisor the connection is made. FIG. 8B illustrates a virtual storage management table. The table registers, for each virtual storage, the volume, to what level the allocation has already been performed, the free volume, and which of the real storage units are allocated. FIG. 8C illustrates a virtual disk table. This table registers the volumes of virtual disks, and the real storage units that are allocated.

The table illustrated in FIG. 9 is stored in the management server, and is generated from the tables illustrated in FIGS. 6C and 8A through 8C. The table in FIG. 9 registers, for combinations between respective VM hosts and respective storage units, the average value of latencies and whether or not a virtual machine can access the storage machine. When, for example, obtaining the average value of latencies of VH1-SU2 is discussed, it is recognized that VH1 is provided with VD1, VD2, and VD3 from FIG. 8A. Further, it is recognized that VH1 is provided with VG1 and VG2. By referring to FIG. 8C, it is recognized that VD1 corresponds to VS1, VD2 corresponds to VS2, and VD3 corresponds to VS2, and by referring to FIG. 8B, it is recognized that VS1 corresponds to SU1, VS2 corresponds to SU2, and VS3 corresponds to SU3. Accordingly, it is recognized that VD1 corresponds to SU1, VD2 corresponds to SU2, and VD3 corresponds to SU3, and from FIG. 6C, the average value of the pair of VH1 and SU2 can be obtained by obtaining the pair of VG1 and VD3 and the pair of VG2 and VD2. Accordingly, from FIG. 6C, the average value of latencies recorded in the field corresponding to VH1 and SU2 in FIG. 9 is obtained by averaging the average values of the pair of VG1 and VD3 and the pair of VG2 and VD2. When data is not registered in latency, this means that the storage unit has not been measured. Also, when "accessible" is "true", disk allocation can be performed from Hypervisor to the storage unit while when "accessible" is "false", the disk allocation is not possible. In the configuration illustrated in FIG. 7, storage unit SU3 is included in the system, while VH1 or VH2 is not connected to storage unit SU3, and thus, access is not possible. Thus, the table illustrates in FIG. 9 registering "accessible" is "false" in the column of storage unit SU3.

Figure 10:
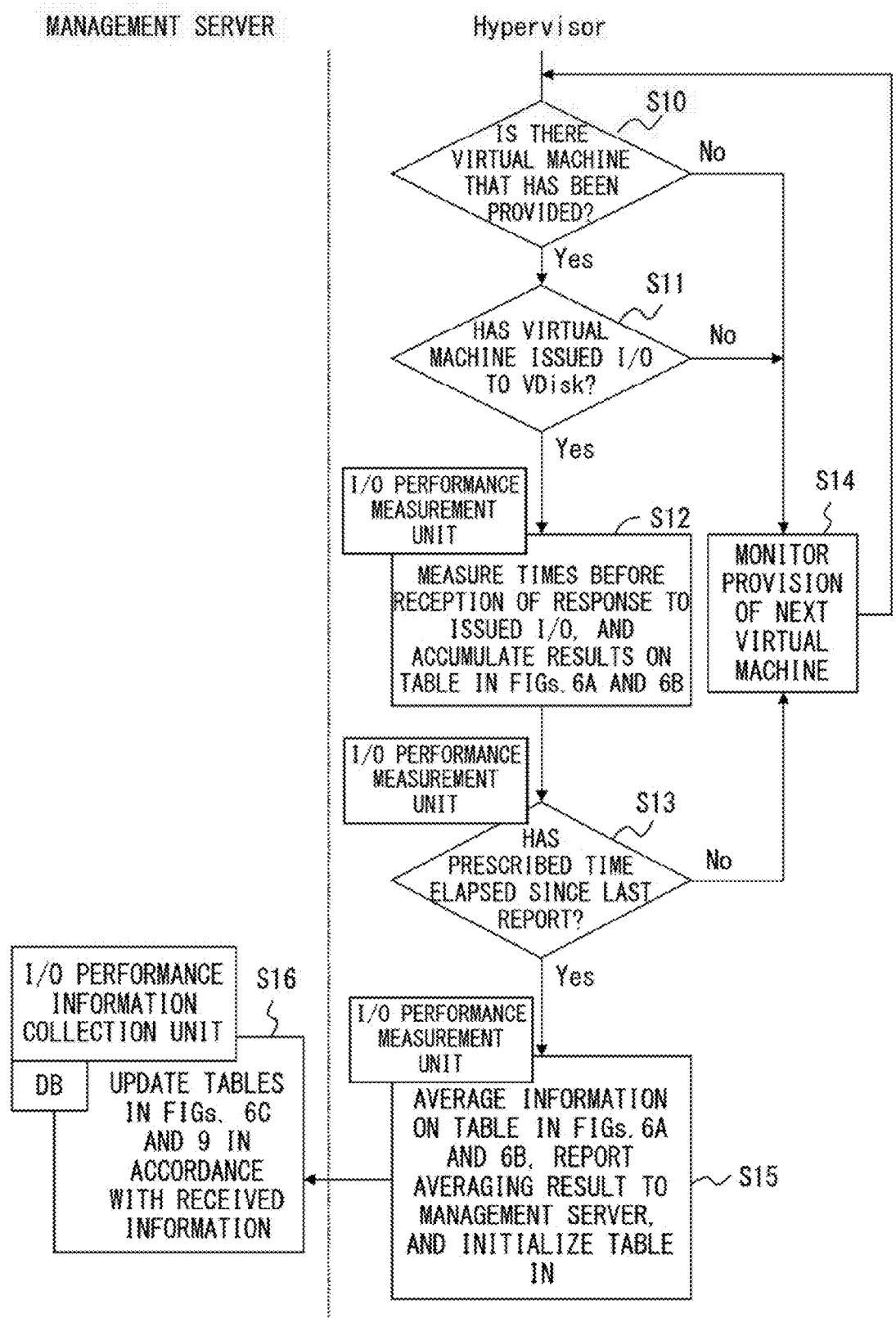
FIG. 10 illustrates a data configuration employed in the present embodiment (fifth)

FIG. 10 is a flowchart explaining processes executed in an ordinary situation according to the present embodiment.

Hypervisor is continuously monitoring whether or not a virtual machine is provided, and determines in step S10 whether or not there is a virtual machine that has been provided. When the determination result in step S10 is No, the process proceeds to step S14. When the determination result in step S10 is Yes, Hypervisor determines in step S11 whether or not a virtual machine has issued an I/O process request to a virtual disk (Vdisk). When the determination result in step S11 is No, the process proceeds to step S14.

When the determination result in step S11 is Yes, the I/O performance measurement unit measures a time that elapsed before a response to the issued I/O process request was received, and accumulates the response time as a latency on the table in FIGS. 6A and 6B. In step S13, the I/O performance measurement unit determines whether or not a prescribed time has elapsed since an average response time was reported to the management server for the last time. This prescribed time is set appropriately by a system designer in accordance with the issuing frequency of I/O process requests or the like. When the determination result in step S13 is No, the process proceeds to step S14. When the determination result in step S13 is Yes, the process proceeds to step S15.

In step S14, Hypervisor again performs operations of monitoring a provision of virtual machines. In this situation, Hypervisor monitors the provision of new virtual machines or deletion of virtual machines. When a new provision of a virtual machine has been detected, Hypervisor performs the process in step S10. In step S15, the I/O performance measurement unit averages the latencies in the table in FIGS. 6A and 6B, reports the resultant value to the management server, and deletes latency information in the table in FIGS. 6A and 6B so as to initialize the table.

The I/O performance information collection unit in management server refers to the database so as to update the tables illustrated in FIGS. 6C and 9 in accordance with the information of the average value of the latencies received from Hypervisor.

Figure 11B:
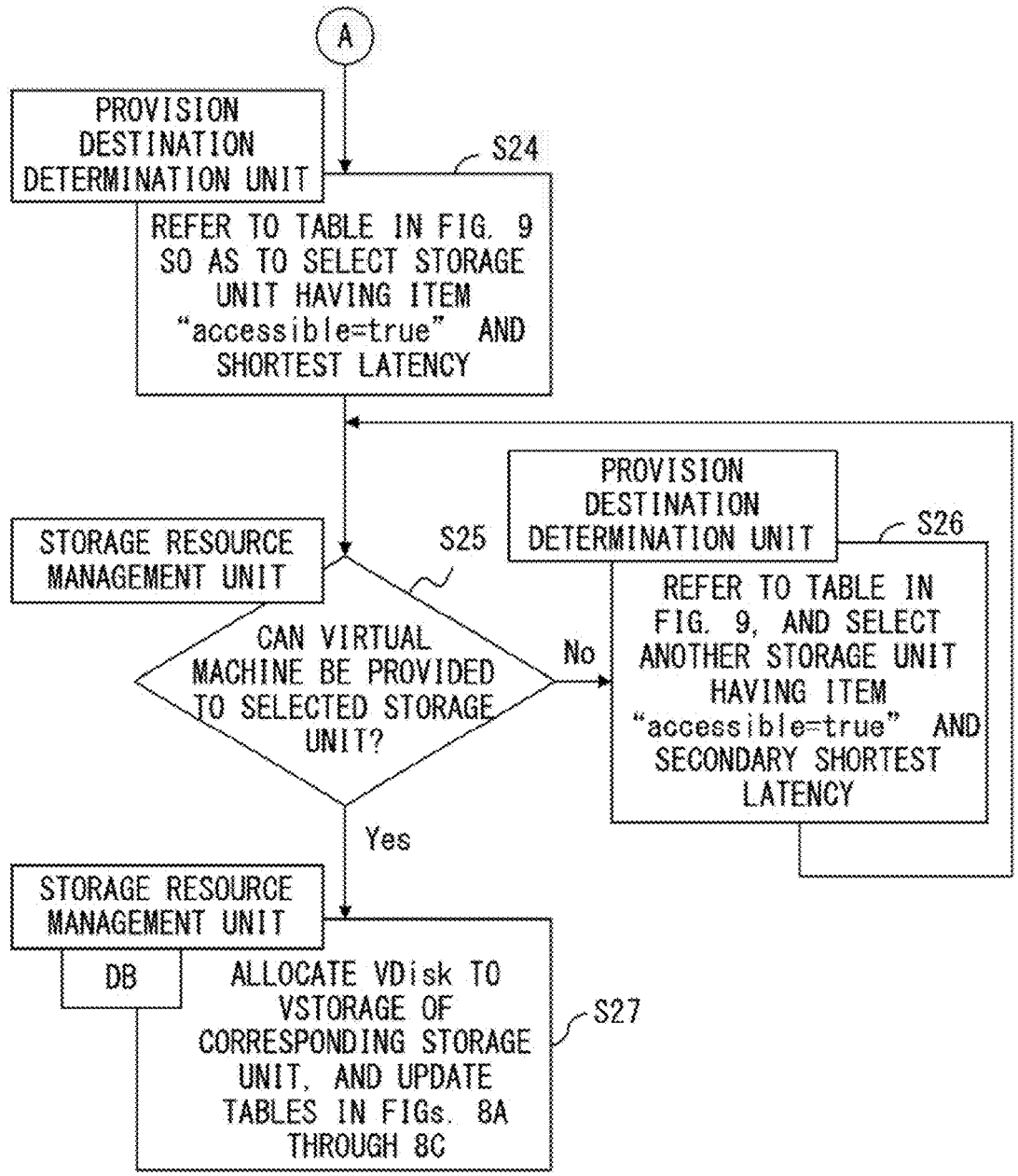

FIGS. 11A and 11B are flowcharts explaining a process of providing a new virtual machine.

In step S20, a virtual machine is generated newly. In step S21, the provision destination determination unit uses a conventional method in order to determine a computer (Hypervisor) to which a virtual machine is to be provided. As a conventional method, a method in which a computer (Hypervisor) that has used fewer CPU resources is selected is used. In step S22, the provision destination determination unit refers to the table in FIG. 9 so as to determine whether or not there is at least one storage unit that has the items "accessible=true" and "latency:—" for the Hypervisor to which a virtual machine is to be provided.

When the determination result in step S22 is Yes, the provision destination determination unit determines in step S23, by using a conventional method, a storage unit to which a virtual machine is provided from among storage units having the items "accessible=true" and "latency:—". A conventional method means selecting a storage unit having a large free volume on disk. When the determination result in step S22 is No, the provision destination determination unit refers, in step S24, to the table in FIG. 9 so as to select the storage unit having the item "accessible=true" and the shortest latency. In the example illustrated in FIG. 9, when a virtual machine is to be provided to VH1, SU1 is selected as the provision destination because the latency of "VH1-SU1" is 15 msec while the latency of "VH1-SU2" is 35 msec.

In step S25, the storage resource management unit determines whether or not a virtual machine can be provided to the selected storage unit. Whether or not such a provision is possible is determined by confirming whether or not a storage volume that the virtual machine needs can be secured in the selected storage unit. When the determination result in step S25 is No, the provision destination determination unit refers, in step S26, to the table in FIG. 9, and selects another storage unit having the item "accessible=true" and the secondary shortest latency, and the process returns to step S25. When the determination result in step S25 is Yes, the storage resource management unit refers, in step S27, to a database, and allocates the virtual disk to VStorage of the corresponding storage unit in the tables in FIGS. 8A through 8C, and thereafter updates the tables.

The above embodiment leaves a possibility that the combination of "VMguest-VDisk" that was provided when the performance table was still incomplete is not optimum.

Thus, after the completion of the table in FIG. 9, the migration of VM or VDisk is performed so that the latency becomes shorter for the combination of "virtual machine-virtual disk (VDisk)" having the longest latency by periodically monitoring the values in the table illustrated in FIG. 6C.

In the present embodiment, the destination of virtual disk migration is determined, and the process of the migration itself is performed using a conventional method.

According to the above configuration, VDisk having the highest response performance can also be allocated to a virtual machine that has already been provided.

FIG. 12 illustrates a data structure used for performing migration.

The data structure illustrated in FIG. 12 corresponds to the table illustrated in FIG. 6C, and the system configuration using this structure is illustrated in FIG. 7.

As illustrated in FIG. 12, the frequency of an I/O request (I/O frequency) is added to the table illustrated in FIG. 6C. The I/O frequency is the number of, for example, input/output requests issued in one minute to a storage unit from a virtual machine. In this example, the average value of I/O frequencies is 20 times per minute. The management server regards combinations having I/O frequencies higher than a threshold as candidates for the migration implement. A threshold is, for example, sixty percent of the average value of I/O frequencies or the like, and is set in the management server by the system designer.

FIGS. 13A, 13B, 14A and 14B are flowcharts explaining processes performed when migration is performed.

Figure 13A:
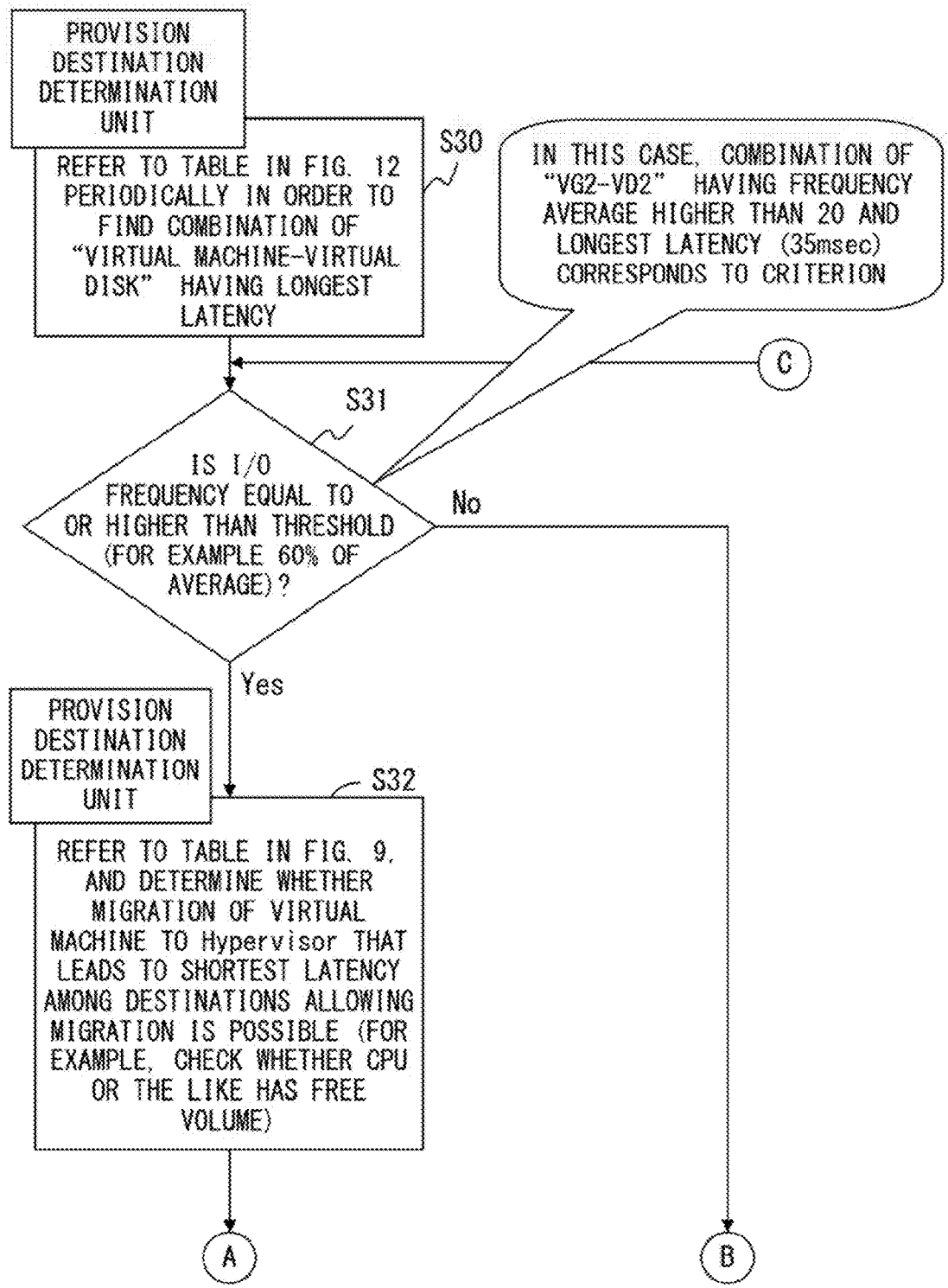
FIGS. 13A and 13B are flowcharts (first) for processes performed when migration is performed.
Figure 13B:
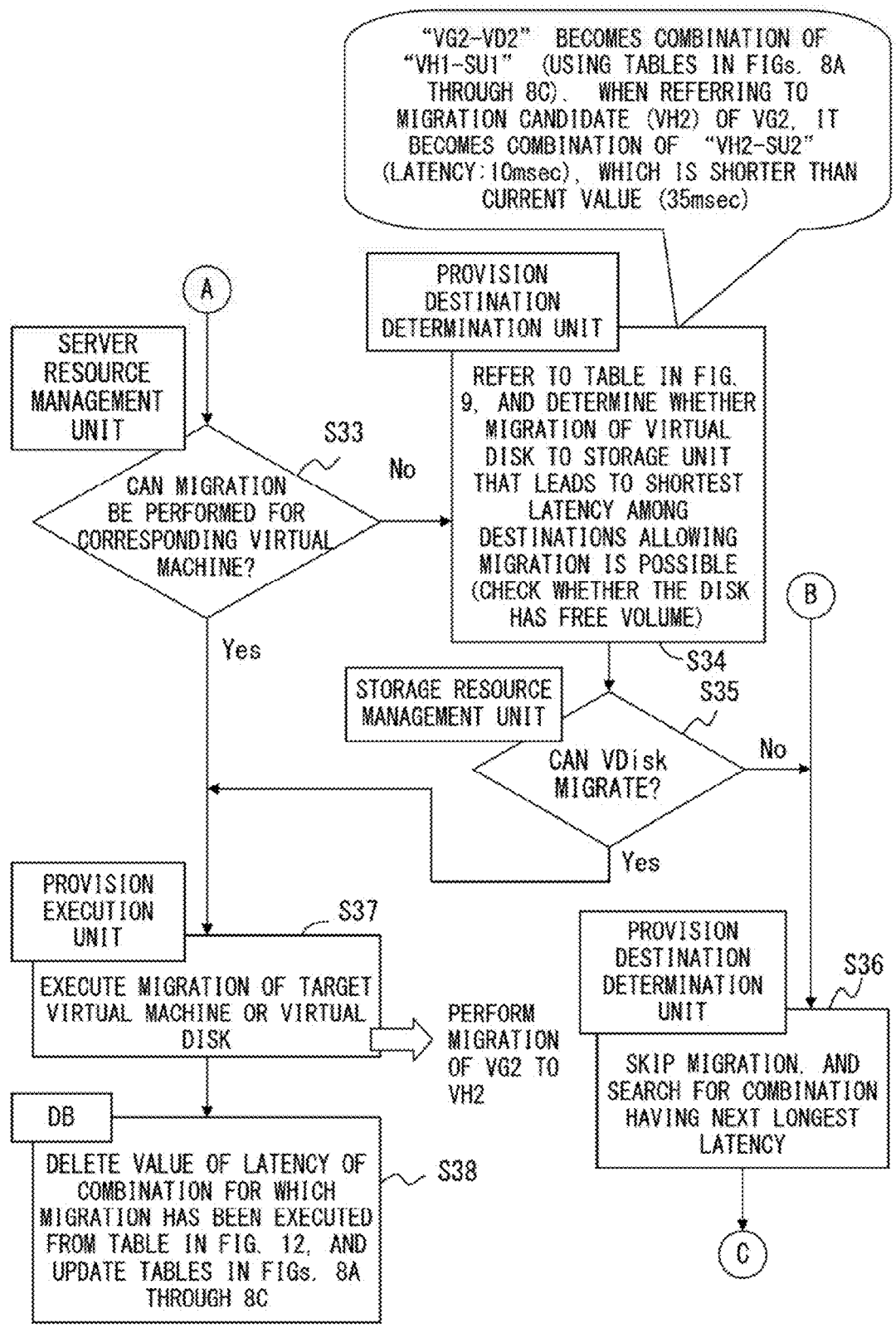
Figure 14A:
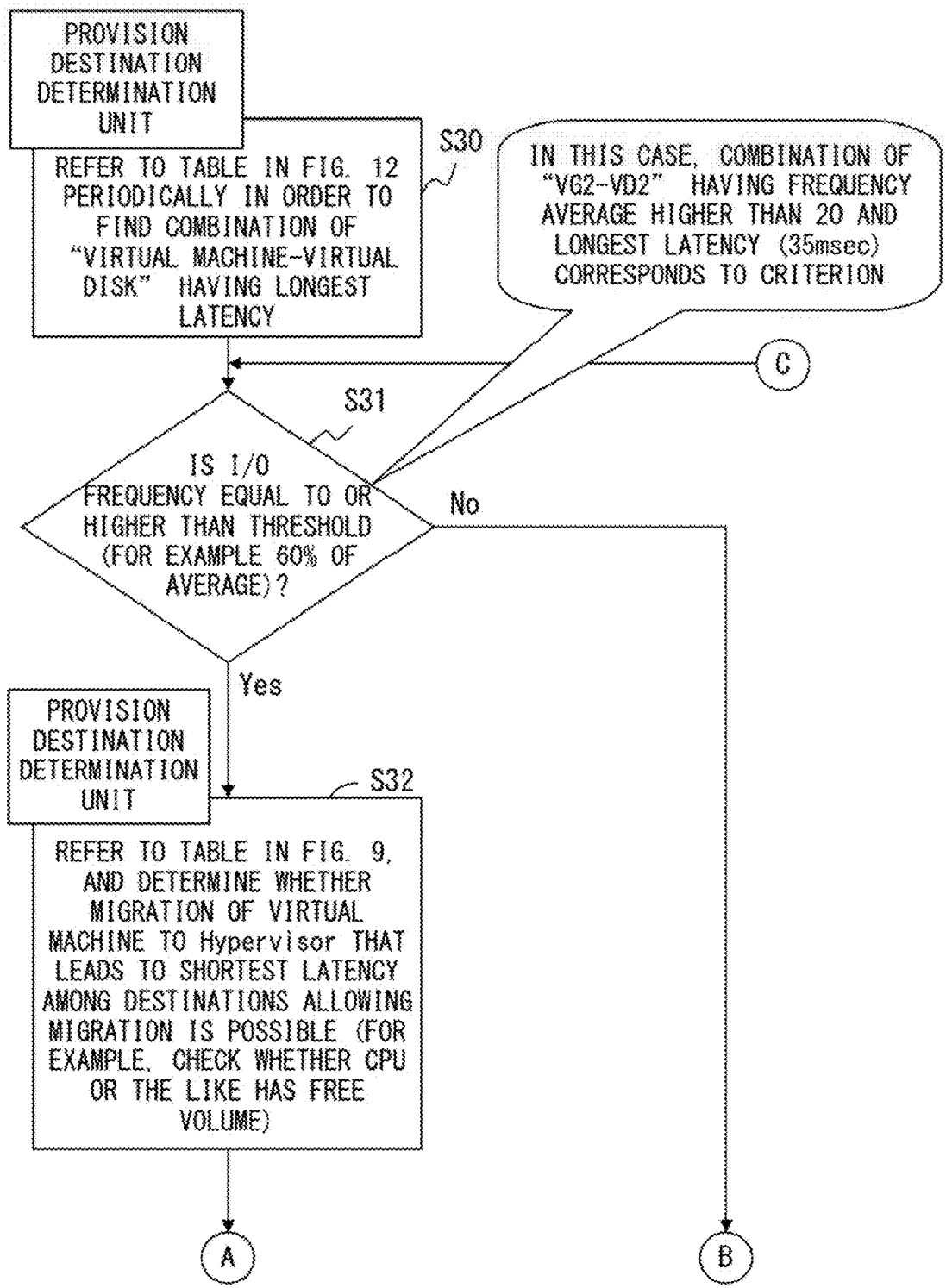
FIGS. 14A and 14B are flowcharts (second) for processes performed when migration is performed.
Figure 14B:
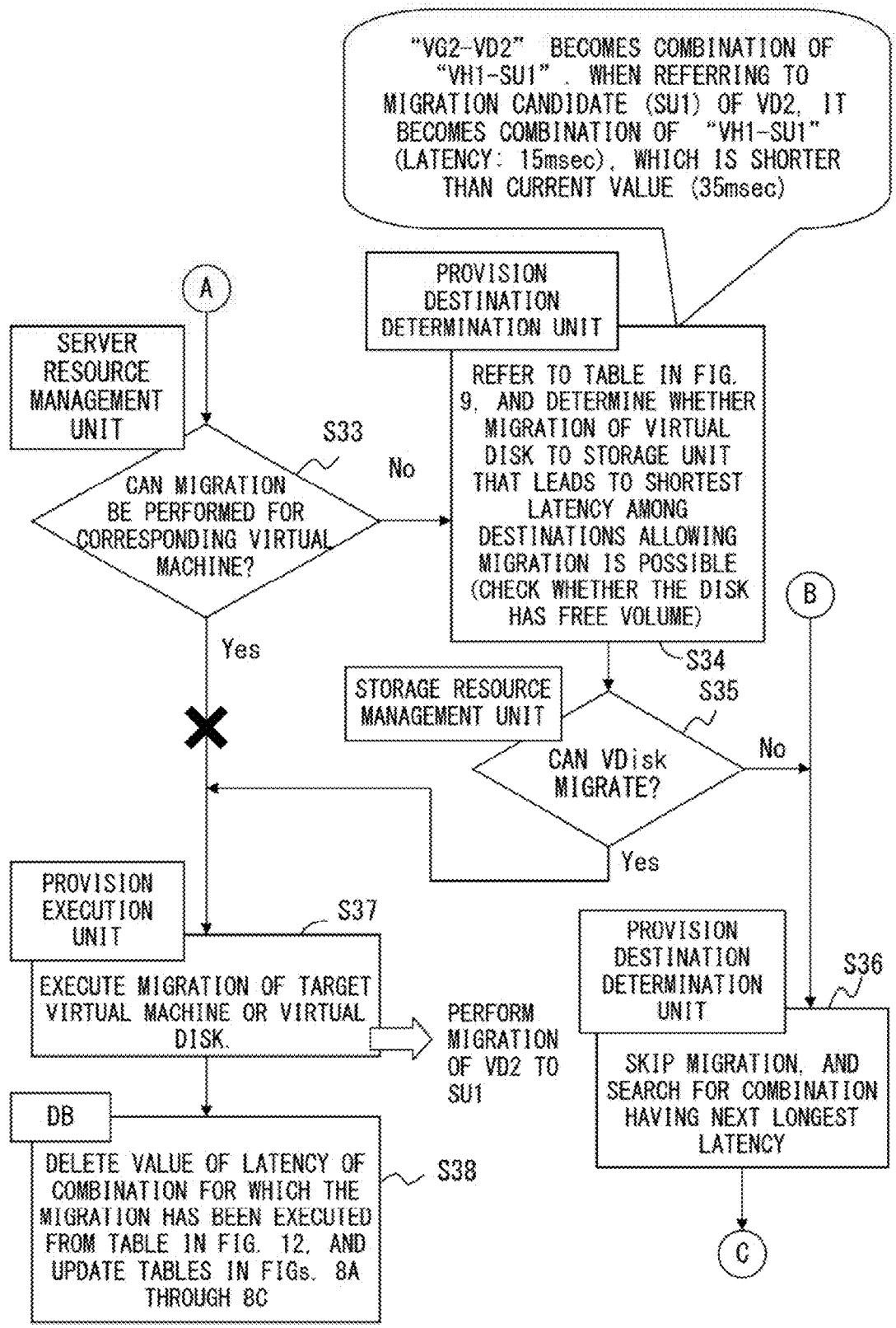

FIGS. 13A and 13B explain a flow of the process that refers to the table in FIG. 12, which is performed when a virtual machine migrates, and FIGS. 14A and 14B explain a flow of the process that refers to the table in FIG. 12, which is performed when a virtual disk migrates.

In FIGS. 13A and 13B, the provision destination determination unit periodically refers to the table in FIG. 12 in order to find the combination of "virtual machine-virtual disk" having the longest latency in step S30. In step S31, it is determined whether or not the I/O frequency is equal to or higher than a threshold (for example, sixty percent of the average value). In the example of the table illustrated in FIG. 12, the combination of "VG2-VD2" has an I/O frequency equal to or higher than the threshold value, i.e., 12, and also has the longest latency, 35 msec. When the determination result in step S31 is No, the process proceeds to step S36, and migration is not performed, a search is conducted for the combination having the second longest latency, and thereafter the process returns to step S31.

When the determination result in step S31 is Yes, the provision destination determination unit refers in step S32 to the table in FIG. 9, and determines whether or not migration of a virtual machine to a Hypervisor that leads to the shortest latency among destinations allowing migration is possible. For example, it is checked whether or not each migration destination has a CPU having a free usage. According to the tables illustrated in FIGS. 8A through 8C, "VG2-VD2" has been provided to the combination of "VH1-SU2". In other words, FIG. 8C illustrates that VG2 has been provided to VH1, and VD2 has been connected. Also, FIG. 8C illustrates that VD2 has been provided to VS2, and FIG. 8B illustrates that VS2 has been provided to SU2. Accordingly, it is understood that "VG2-VD2" has been provided to the combination of "VH1-SU2". Referring to a migration candidate (VH2) of VG2, it is understood that provision has been performed for the combination of "VH2-SU2" and that the latency is 15 msec. Accordingly, the result of the migration is shorter than the current value, 35 msec, and accordingly the migration of the virtual machine is possible. In other words, VG2 is currently in VH1, and VG2 is moved to VH2 by migration. Then, VG2 is provided to the combination of "VH2-SU2". When FIG. 9 is referred to, the average value of the latencies of the combination of "VH2-SU2" is 15 msec, and "accessible: true" is given, which means that the migration is possible.

In step S33, the server resource management unit determines whether or not migration can be performed for the corresponding virtual machine. In the case illustrated in FIGS. 13A and 13B, the migration is assumed to have been determined to be possible. When the determination result in step S33 is No, the provision destination determination unit refers in step S34 to the table in FIG. 9, and determines whether or not migration of a virtual disk to the storage unit that leads to the shortest latency among destinations allowing migration is possible. For example, it is checked whether the disk has a free volume. In step S35, the storage resource management unit determines whether or not the migration of the virtual disk is possible. When the determination result is No, the process proceeds to step S36, and when the result is Yes, the process proceeds to step S37. In the case illustrated in FIGS. 13A and 13B, the result in step S33 is Yes, and so the migration of a virtual machine may be performed, and the process proceeds from step S33 to S37.

In step S37, the provision execution unit performs migration of the target virtual machine or virtual disk. In this example, the migration of VG2 to VH2 is executed. In step S38, the value of the latency of the combination that migrated from the table in FIG. 12 is deleted in a database in the management server, the tables in FIGS. 8A through 8C are updated, and the process is terminated.

In FIGS. 14A and 14B, the provision destination determination unit periodically refers in step S30 to the table in FIG. 12, and searches for the combination of a virtual machine and a virtual disk that has the longest latency. In step S31, it is determined whether or not the I/O frequency is equal to or higher than a threshold (for example, sixty percent of the average value) in step S31. In the example of the table illustrated in FIG. 12, the combination of "VG2-VD2" has an I/O frequency equal to or higher than the threshold value i.e., 12, and also has the largest latency, 35 msec. When the determination result in step S31 is No, the process proceeds to step S36, migration is not performed, the combination having the second longest latency is searched for, and thereafter the process returns to step S31.

When the determination result in step S31 is Yes, the provision destination determination unit refers in step S32 to the table illustrated in FIG. 9, and determines whether or not migration of a virtual machine to the Hypervisor that leads to the shortest latency among destinations allowing migration is possible.

In step S33, the server resource management unit determines whether or not the migration of the corresponding virtual machine is possible. The reason for determining whether or not migration of the virtual machine is possible first is that copying the disk for migration of a virtual disk is costly while migration of a virtual machine is less costly because only information in memory is to be copied. In the case of FIGS. 14A and 14B, a case where possible migration of virtual machines has been finished is assumed, and migration of a virtual disk is performed, and thus the process proceeds to step S34. In step S34, the provision destination determination unit refers to the table in FIG. 9 so as to determine whether or not the migration of a virtual disk to the storage unit that leads to the shortest latency is possible. For example, whether the disk has a free volume is checked. It is understood that "VG2-VD2" has been provided to the combination of "VH1-SU2". In other words, FIG. 8A indicates that VG2 has been provided to VH1. FIG. 8C indicates that VD2 has been provided to VS2. Further, FIG. 8B indicates that VS2 has been provided to SU2. Accordingly, it is understood that VG2-VD2 has been provided to the combination of VH1-SU2. Thus, when VD2 migrates, VD2 moves from SU2 to SU1 (SU3 is not connected, and thus SU3 does not become a migration destination). Accordingly, the combination of VG2-VD2 is to be provided to the combination of VH1-SU1 after migration. Referring to the migration candidate of VD2 (SU1), it is understood, from the table in FIG. 9, that the latency of the combination between VH1-SU1 is 10 msec, which is shorter than the current latency, 35 msec. In step S35, the storage resource management unit determines whether or not migration of a virtual disk is possible, and when the determination result is No, the process proceeds to step S36, and when the result is Yes, the process proceeds to step S37. In the case illustrated in FIGS. 14A and 14B, migration of a virtual disk is possible, and thus the process proceeds to step S37.

In step S37, the provision execution unit executes the migration of the target virtual machine or virtual disk. In this example, the migration from VD2 to SU1 is executed. In step S38, in the database of the management server, the value of the latency of the combination for which the migration has been executed is deleted from the table illustrated in FIG. 12. Thereafter, the tables illustrated in FIGS. 8A through 8C are updated, and the process is terminated.

Figure 15:
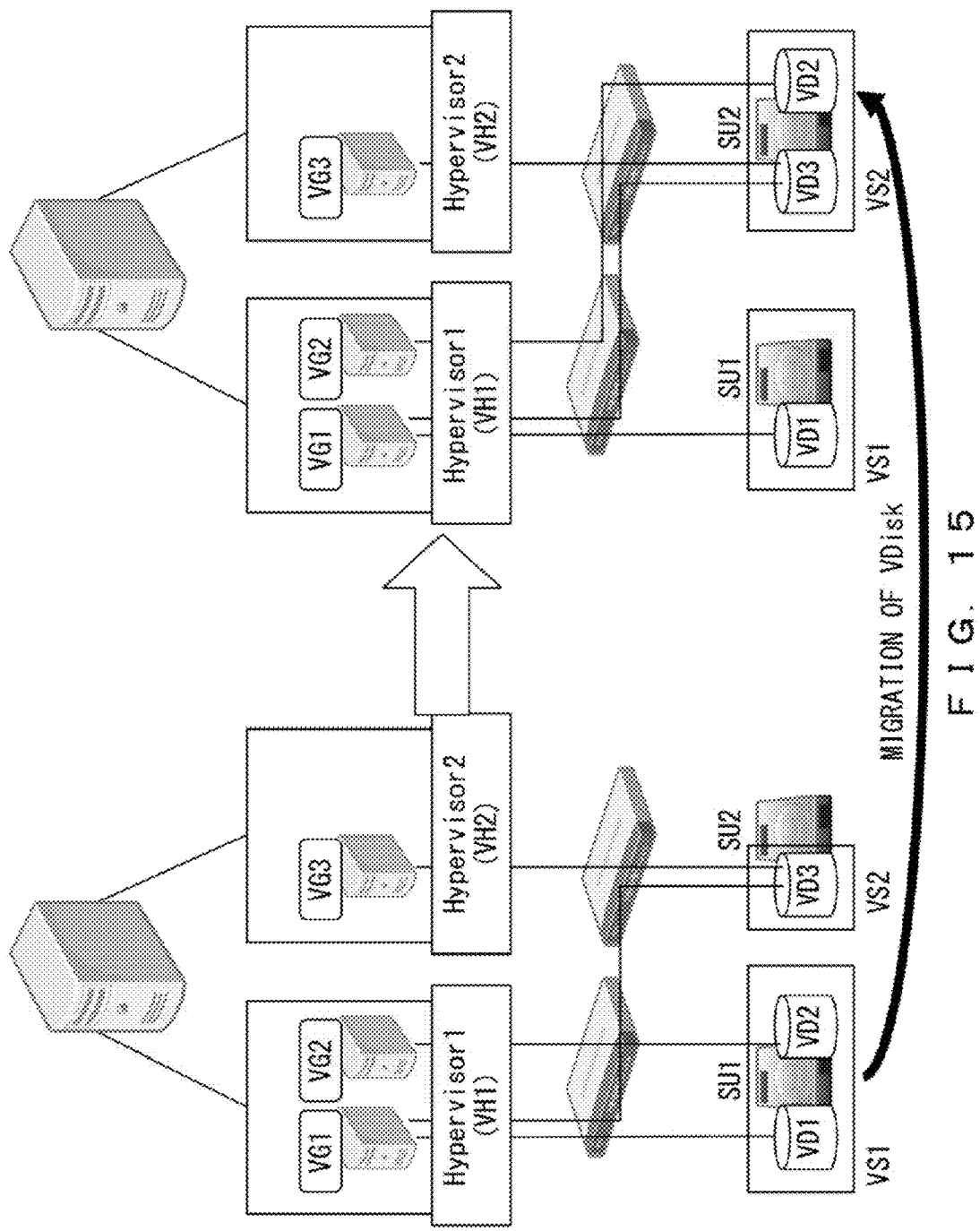
FIG. 15 explains a concept of migration of a virtual disk.

FIG. 15 explains a concept of migration of a virtual disk.

First, a case is assumed in which virtual disks VD1 through VD3 are provided to Hypervisor1 (VH1), and virtual disk VD3 is provided to Hypervisor2 (VH2). Virtual disks VD1 and VD2 are allocated to storage unit SU1, and constitute virtual storage VS1. Virtual disk VD3 is allocated to storage unit SU2, and constitutes virtual storage VS1. When migration of virtual disk VD2 is discussed, virtual disk VD2 is moved to storage unit SU2, and constitutes virtual storage VS2. As described above, a storage unit having a good latency is selected from among storage units, and the selected storage unit can be set arbitrarily.

Figure 16:
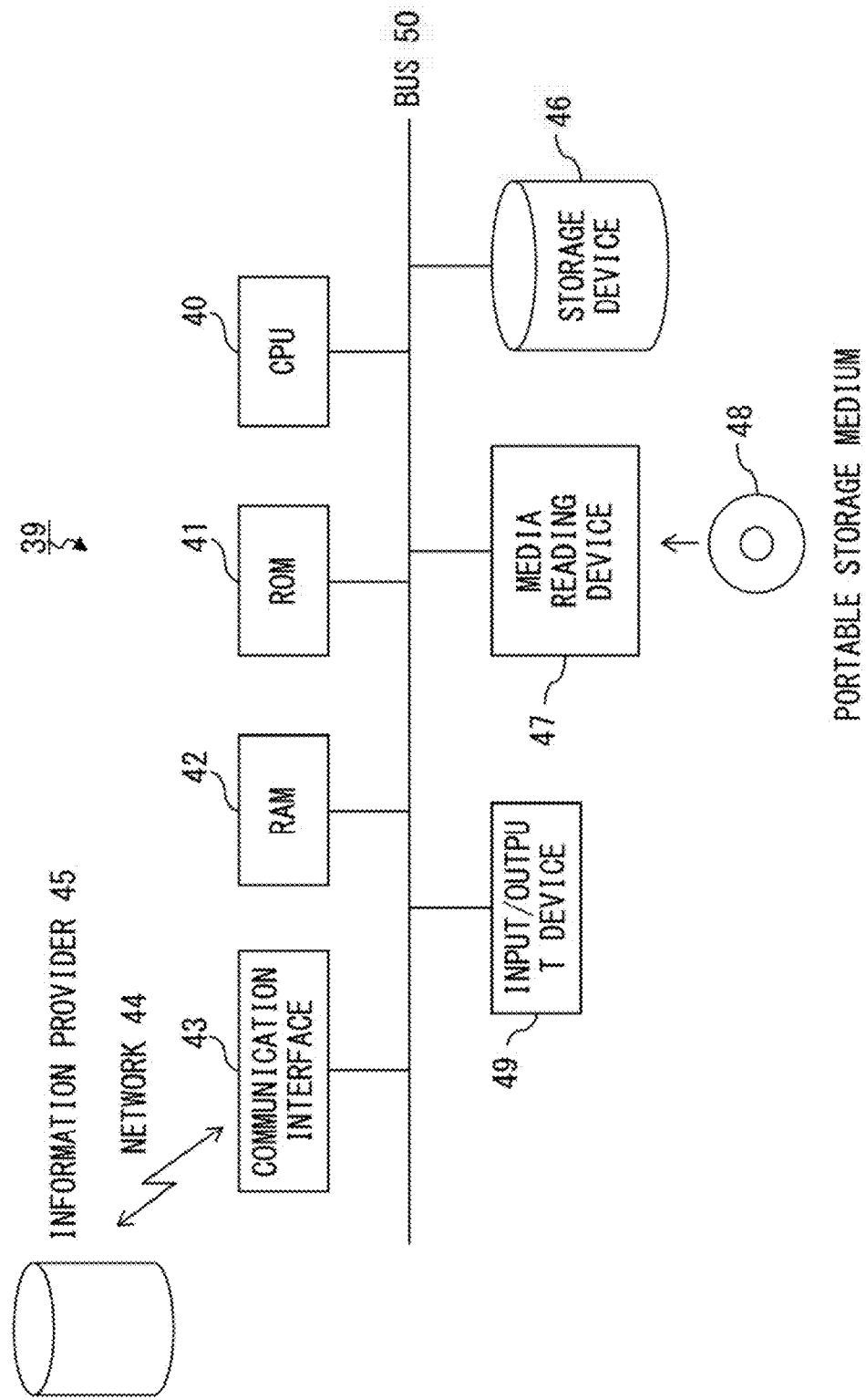
FIG. 16 illustrates a hardware configuration of a computer when processes of the present embodiment are implemented in the form of a program.

FIG. 16 illustrates a hardware configuration of a computer when the processes of the present embodiment are implemented in the form of a program.

ROM 41, RAM 42, a communication interface 43, a storage device 46, a media reading device 47, and an input/output device 49 are connected to a CPU 40 via a bus 50. The CPU 40 reads a basic program such as BIOS or the like stored in the ROM 41 to execute it so as to implement fundamental operations of a computer 39.

Also, the CPU 40 distributes onto the RAM 42 a program that is for executing processes of the present embodiment and that is stored in the storage device 46 such as a hard disk, and executes it so as to implement processes of the present embodiment. A program for executing processes of the present embodiment does not have to be stored in the storage device 46, and may be stored in a portable storage medium 48 such as a CD-ROM, a DVD, a Blu-ray disk, IC memory, a flexible disk, or the like. In such a case, the media reading device 47 is used to reading the program stored in the portable storage medium 48 to distribute the program onto the RAM 42, and the CPU 40 executes the program.

The input/output device 49 is a device such as a keyboard, a tablet, a mouse, a display device, a printer, or the like that allows users operating the computer 39 to input information, or to make the computer output processing results.

The communication interface 43 accesses a database or the like owned by an information provider 45 via the network 44, and downloads a program or the like to the computer 39. The downloaded program is stored in the storage device 46 or the portable storage medium 48, or is distributed directly onto the RAM 42 so as to be executed by the CPU 40. It is also possible to employ a configuration in which the execution of a program is performed by a computer owned by the information provider 45 while the computer 39 performs only input/output operations.

According to the above-mentioned embodiments, it is possible to provide a storage system that can perform more efficient allocation of a virtual disk.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. A storage system, comprising:
   a plurality of storage units to which a plurality of virtual disks are provided;
   a plurality of computers to activate a plurality of virtual machines, and to measure a latency of an input/output process request issued by each of the virtual machines for performing control of each of the plurality of virtual disks; and
   a management server to change a first combination of one of the plurality of computers and one of the plurality of storage units, to which a second combination of one of the plurality of virtual machines and one of the plurality of virtual disks are provided, to a third combination of one of the plurality of computers and one of the plurality of storage units so that an average value of latencies in the third combination is smaller than an average value of latencies in the first combination in accordance with latencies measured by the plurality of computers.

2. The storage system according to claim 1, wherein:
   the second combination of the one of the plurality of virtual machines and the one of the plurality of virtual disks is provided to the third combination of the one of the plurality of computers and the one of the plurality of storage units in accordance with a free volume in the one of the plurality of storage units before the measurement of latencies is completed.

3. The storage system according to claim 1, wherein:
   the latency is a response time that elapses after the input/output process request is issued to each of the plurality of storage units and before the process is completed.

4. The storage system according to claim 1, wherein:
   each of the plurality of virtual machines includes a virtual machine guest to control each of the plurality of virtual disks, and a virtual machine host to control the virtual machine guest.

5. A storage system comprising:
   a plurality of storage units to which a plurality of virtual disks are provided;
   a plurality of computers to activate a plurality of virtual machines, and to measure a latency of an input/output process request issued by each of the virtual machines for performing control of each of the plurality of virtual disks; and
   a management server to provide, to a first combination of one of the plurality of computers and one of the plurality of storage units, a second combination of one of the plurality of virtual machines and one of the plurality of virtual disks so that the second combination has a smallest average value of latencies in accordance with latencies measured by the plurality of computers,
   wherein re-provision is performed for the one of the plurality of virtual machines and the one of the plurality of virtual disks having a higher frequency of issuing the input/output process request than a prescribed value from among the plurality of virtual machines and the plurality of virtual disks that have been provided to the plurality of computers and the plurality of storage units so that an average value of latencies becomes smaller.

6. The storage system according to claim 5, wherein:
   re-provision of the one of the plurality of virtual machines is performed first, and re-provision of the one of the plurality of virtual disks is performed after the re-provision of the one of the plurality of virtual machines is performed.

7. A processing method for a storage system including a plurality of storage units to which a plurality of virtual disk disks are provided, a plurality of computers to control the plurality of virtual disks by activating a plurality of virtual machines, and a management server to manage the plurality of storage units and the plurality of computers, the processing method comprising:

measuring a latency for an input/output process request issued by each of the virtual machines to each of the virtual disks, the measuring being performed by the plurality of computers; and changing a first combination of one of the plurality of computers and one of the plurality of storage units, to which a second combination of one of the plurality of virtual machines and one of the plurality of virtual disks are provided, to a third combination of one of the plurality of computers and one of the plurality of storage units so that an average value of latencies in the third combination is smaller than an average value of latencies in the first combination in accordance with latencies measured by the plurality of computers, the providing being performed by the management server.

8. A non-transitory computer readable storage medium storing a program for a storage system including a plurality of storage units to which a plurality of virtual disks are provided, a plurality of computers to control the plurality of virtual disks by activating a plurality of virtual machines, and a management server to manage the plurality of storage units and the plurality of computers, the program causing the storage system to execute a process comprising:

measuring a latency for an input/output process request issued by each of the virtual machines to each of the virtual disks, the measuring being performed by the plurality of computers; and changing a first combination of one of the plurality of computers and one of the plurality of storage units, to which a second combination of one of the plurality of virtual machines and one of the plurality of virtual disks are provided, to a third combination of one of the plurality of computers and one of the plurality of storage units so that an average value of latencies in the third combination is smaller than an average value of latencies in the first combination in accordance with latencies measured by the plurality of computers, the providing being performed by the management server.

* * * * *